Nov. 21, 1933.　　　　G. H. WINGATE　　　　1,936,319
FOLDING SPECTACLES
Filed July 2, 1931
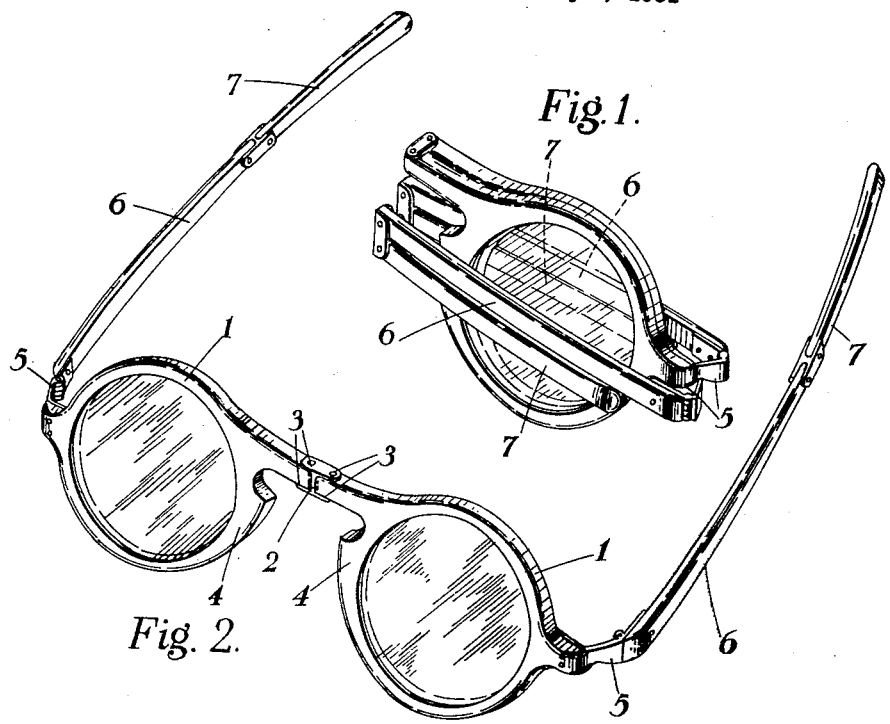
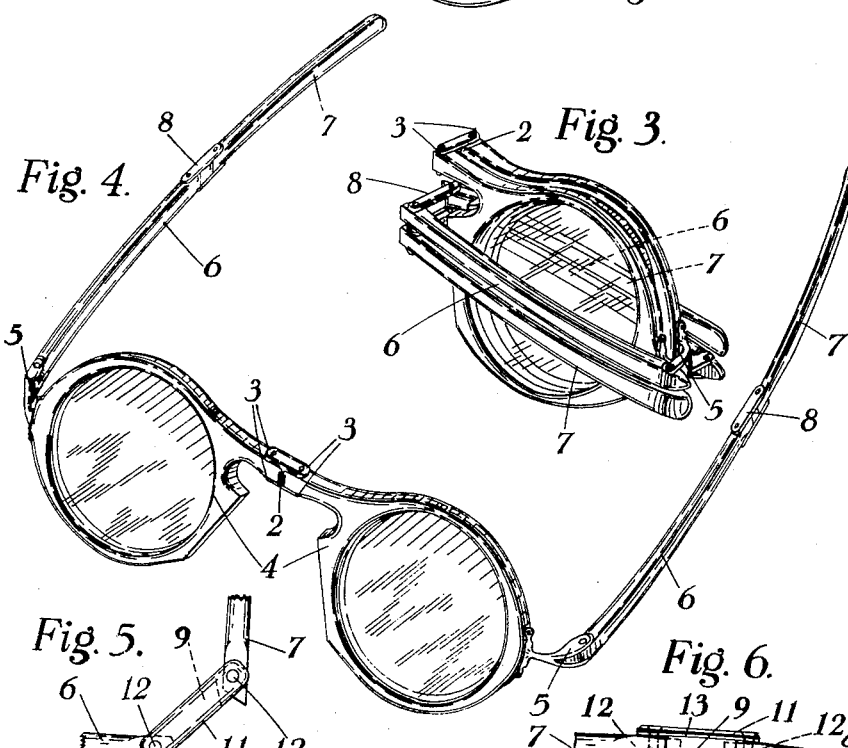
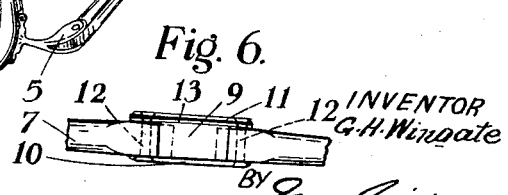
INVENTOR
G. H. Wingate
BY
ATTORNEY Patented Nov. 21, 1933

1,936,319

UNITED STATES PATENT OFFICE 1,936,319

FOLDING SPECTACLES

Gerald Henry Wingate, London, England

Application July 2, 1931, Serial No. 548,413, and in Great Britain July 14, 1930

6 Claims. (Cl. 88—44)

This invention relates to folding spectacles.

The main object of the invention is to provide an improved form of folding spectacles of the kind in which the eyes fold together by movement in a more-or-less horizontal plane.

In spectacles according to the present invention, the eyes fold with the insides of the lenses towards one another, and the attachments of the sides (which are themselves foldable or collapsible) are so arranged that each side when the eyes are folded folds down against the front or outside of the eye to which it is not attached. For convenience, this construction is hereinafter to be understood from the phrase "intercrossing sides".

Where the sides comprise two or more limbs jointed together the outer limbs may again intercross and lie against the opposite side of the folded eyes: each of the sides is thus, as it were, wrapped around the folded eyes. Alternatively each folded side may lie as a complete folded unit against the front of the eye to which it is not attached.

In either case, the folded sides lie upon both sides of the eyes, which lie in the centre, and the lenses are thus afforded considerable protection when the spectacles are folded.

The invention comprises further features in such spectacles. Thus it comprises the use of a bridge piece which has no function as a rest upon the wearer's nose, but only as a hinged connecting piece; it also comprises the use of sides each having a second limb which lies upon the opposite side of the folded eyes to the first and substantially parallel and adjacent to the first limb of the other side: it also comprises the use of a bridge piece comprising a central part against which the two hinged eyes both abut when open and serving as a whole as part of the vertical pivot at the centre of the bridge: other parts of the invention comprise the improved features, combinations and arrangements embodied in the preferred forms of frame which it is now proposed to describe in more detail.

These forms are shown upon the accompanying drawing, wherein:—

Figure 1 is a perspective view of a folded pair of spectacles, and

Figure 2 of the same pair open.

Figures 3 and 4 are corresponding views of another form, and

Figures 5 and 6 are details showing a joint.

As illustrated, in both forms the eyes and bridge consist of a pair of frames 1, 1 connected by a single pivot or bridge piece disposed substantially vertically at the centre of the bridge. This may conveniently take the form of a hinge with its axis at or near the inside edge of the bridge so that the eyes can fold inwardly but abutting portions prevent them from being moved further outwardly when they have reached the fully open position. As illustrated, however, it comprises a central part 2 against which both the eyes abut when open and cheniers or forks 3 at each side to which the eyes are pivoted. The hinge or bridge piece may be let into the material at the top and bottom of the bridge so as to avoid unsightliness. Metal bushes or other fixed pieces may be employed to avoid wear when tortoiseshell or other non-metallic eyes are used.

A widening of the material of the eyes at 4, 4 may conveniently be used to provide surfaces to rest upon the nose of the wearer, and for the sake of appearance the material may be recessed above such widenings and below the bridge portion so that the latter (which need thus have no function to rest against the wearer's nose) need not present an unduly heavy appearance. The sides are carried by projections 5, 5 running outwardly and backwardly from the outer edges of the eye frames to about the total thickness of the two folded eyes. These extensions are so arranged or disposed or curved or recessed that upon folding one of the sides (as yet unfolded) it can pass over the extension on the opposite eye and the second side can pass under the corresponding extension on the other eye or side, as will be clear from Figures 1 and 3. The pivots of the sides being now preferably adjacent each to the plane of the front of the eye to which it is not attached, the sides can be folded down thereon and themselves folded or collapsed. As shown at Figures 1 and 2 the sides each consist of two limbs 6, 7 with pivotal connections enabling the outer limb to be folded down beneath the inner limb and substantially within the thickness thereof. As shown at Figures 3 and 4 the second limb 7 is again carried across the eyes by means of an intermediate link 8 and lies parallel to and above or below the first limb 6 of the other side.

The folded spectacles will accordingly in each case take the form of a pair of eyes folded together with their backs or insides adjacent and the limb pivoted to each eye will lie outside the folded eyes and against the front of that eye to which it is not pivoted.

The construction of the links or joints 8 is shown in detail at Figures 5 and 6. The link is made up of a part which combines the central part 9 preferably integral with one of the plates 10 together with a second plate 11 and rivets or screws forming the pivot pins 12. Interposed between the part 9 and the plate 11 is a leaf spring 13 with holes slightly enlarged or slotted for the passage of the pins 12. This spring 13 tends by its resilient pressure upon the parts connected by the joint to keep it from becoming quickly slack from use.

It is to be noted that every pivotally jointed part can be caused to come up against a stop or abutment when the spectacles are opened, giving a perfectly rigid construction as regards the tendencies to movement when the spectacles are in use. At the same time, the movement of the joints away from the abutments brings the spectacles into their folded state.

In the second form a slight outward pressure at or near the extreme ends of the sides actually holds every part definitely in its rigid open position.

It will readily be appreciated that the main ideas of the invention can be embodied in a variety of forms, and that it is not intended to confine this invention in its wider aspects to the specific embodiment described in detail above.

I claim:—

1. In foldable spectacles the combination of eyes pivotally connected together, sides each comprising two limbs pivotally connected, and abutments limiting the pivotal movements in such sense that an outward pressure near the extremities of the sides holds the spectacles in their fully open position.

2. A pair of folding spectacles having eyes, sides each comprising two limbs, pivotal connections between the eyes, between the eyes and the sides, and between the two limbs of each of the sides, and abutments limiting the movement at each pivoted connection, characterized in that all pivotal movements are in a substantially horizontal plane and of such sense that outward pressure at or near the extreme ends of the sides holds all the said pivoted parts against their abutments.

3. Foldable spectacles including eyes pivotally connected for folding with their similar sides adjacent, foldable sides connected to the eyes, one to each eye, the folding of the eyes disposing the connection of the sides thereto into substantially superimposed relation when the eyes are folded, each side being foldable with respect to its eye into a position to overlie the other of such eyes when the parts are folded, whereby the sides lie on opposite sides of the folded eyes relative to that eye to which the particular side is connected.

4. Foldable spectacles including eyes mounted for relative swinging movement to arrange similar sides thereof adjacent, with the eyes in folded relation, a side pivotally connected to each eye, said sides comprising foldable sections, the eyes when folded disposing the respective side connections therewith in superimposed relation at the same ends of the folded eyes, thereby offsetting the plane of fold of the respective sides, each side when folded overlying the relatively outer surface of that folded eye to which the other side is pivotally connected, the folding sections of the sides moving to a position to overlie one of the folded eyes.

5. Foldable spectacles including eyes mounted for relative swinging movement to arrange similar sides thereof adjacent, with the eyes in folded relation, a side pivotally connected to each eye, said sides comprising foldable sections, the eyes when folded disposing the respective side connections therewith in superimposed relation at the same ends of the folded eyes, thereby offsetting the plane of fold of the respective sides, each side when folded overlying the relatively outer surface of that folded eye to which the other side is pivotally connected, the folding section of each side being movable to a position beneath that section of the side to which it is connected.

6. Foldable spectacles including eyes mounted for relative swinging movement to arrange similar sides thereof adjacent, with the eyes in folded relation, a side pivotally connected to each eye, said sides comprising foldable sections, the eyes when folded disposing the respective side connections therewith in superimposed relation at the same ends of the folded eyes, thereby offsetting the plane of fold of the respective sides, each side when folded overlying the relatively outer surface of that folded eye to which the other side is pivotally connected, the folding section of each side being movable to a predetermined aligned relation with the eye-connected section of the other side.

GERALD HENRY WINGATE.